US010197983B2

(12) United States Patent
Lu et al.

(10) Patent No.: US 10,197,983 B2
(45) Date of Patent: Feb. 5, 2019

(54) FAST REPLACEMENT Z-WAVE DEVICE IN HOME AUTOMATION

(71) Applicant: Honeywell International Inc., Morristown, NJ (US)

(72) Inventors: Ming Hong Lu, Shanghai (CN); Zion Gong, Shanghai (CN); Kevin Yong Huang, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 571 days.

(21) Appl. No.: 14/859,576

(22) Filed: Sep. 21, 2015

(65) Prior Publication Data
US 2017/0082997 A1  Mar. 23, 2017

(51) Int. Cl.
*G05B 19/042* (2006.01)
*H04L 12/28* (2006.01)
*G08B 25/10* (2006.01)

(52) U.S. Cl.
CPC ......... *G05B 19/0428* (2013.01); *G08B 25/10* (2013.01); *H04L 12/2803* (2013.01); *G05B 2219/2642* (2013.01)

(58) Field of Classification Search
CPC ........ G05B 19/0428; G05B 2219/2642; G08B 25/10; H04L 12/2803
USPC .......... 700/286; 340/506, 541, 565; 367/136
See application file for complete search history.

(56) References Cited

U.S. PATENT DOCUMENTS

| 8,677,342 B1* | 3/2014 | Kidder | H04L 41/0806 709/221 |
| 8,836,467 B1* | 9/2014 | Cohn | G08B 25/003 340/3.32 |
| 2007/0063836 A1* | 3/2007 | Hayden | G08B 25/003 340/540 |
| 2009/0249325 A1* | 10/2009 | Wontorcik | G06Q 10/06 717/173 |

FOREIGN PATENT DOCUMENTS

WO  WO 2010/097964 A1  9/2010

OTHER PUBLICATIONS

Martinez, Thomas. "Demo expert view openzwave." Online video clip. YouTube, published Feb. 24, 2015. Web. https://www.youtube.com/watch?v=3N_Bh7eQ9Pw.*
Extended European search report for EP patent application 16189523.0, dated Dec. 1, 2016.

* cited by examiner

*Primary Examiner* — Bo Fan
(74) *Attorney, Agent, or Firm* — Husch Blackwell LLP

(57) ABSTRACT

An apparatus including a home automation system having a plurality of sensors that detect events within a predetermined geographic area, a first wireless sensor of the plurality of sensors that operates within the home automation system under a Z-wave format wherein the first wireless sensor has a number of predetermined system operating attributes that are not related to a system address of the first sensor, a replacement wireless sensor having a processor that communicates under a Z-wave format and a program executing on a processor of the home automation system that operatively removes the first sensor from the home automation system and automatically enrolls the replacement sensor with the home automation system by assigning the prede- (Continued)

termined system operating attributes to the replacement sensor.

14 Claims, 1 Drawing Sheet

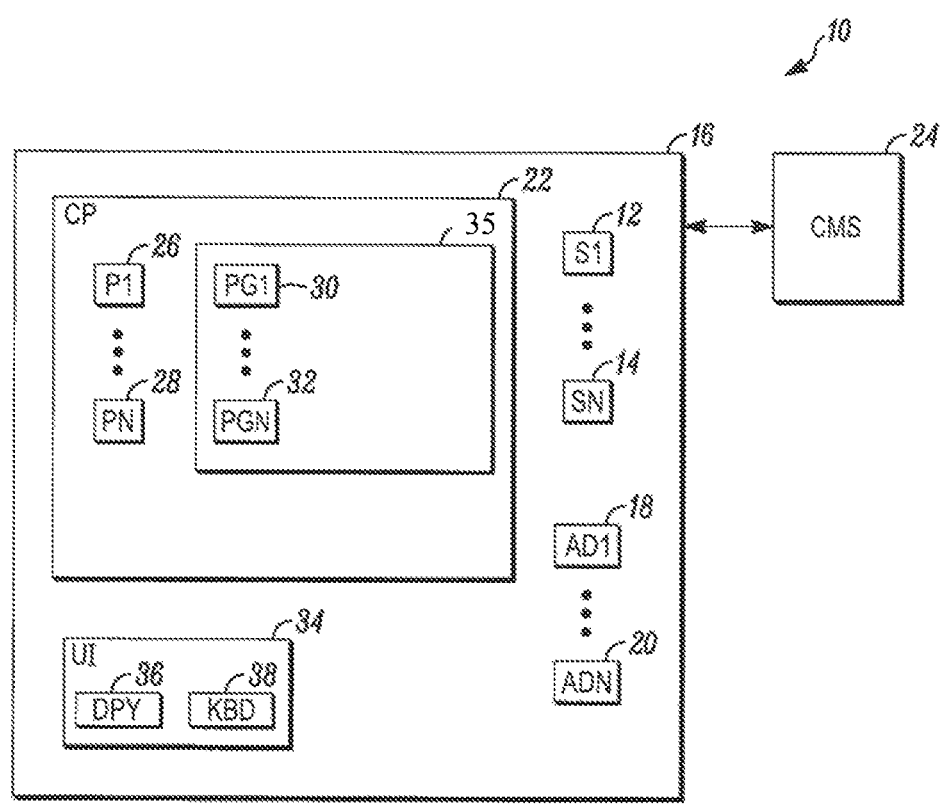

FAST REPLACEMENT Z-WAVE DEVICE IN HOME AUTOMATION

FIELD

This application relates to in-home systems and more particular to home automation systems.

BACKGROUND

Systems are known to automate home functions such as controlling environmental functions such as lighting and providing security. A security system portion of the home automation system protects people and assets within secured areas. Such systems are typically based upon the use of one or more sensors that detect threats within the areas.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

Sensors and controllers may be placed in different areas based upon the respective uses of those areas. For example, fire and/or carbon monoxide detection devices may be placed near sleeping areas of a home while intrusion detectors may be placed near entrances.

In most cases, threat detectors are connected to a local control panel. In the event of a threat detected via one of the sensors, the control panel may sound a local audible alarm. The control panel may also send a signal to a central monitoring station.

While conventional home automation systems work well, it is sometimes difficult or inconvenient to maintain and/or repair sensors or device controllers. Accordingly, a need exists for better methods and apparatus for simplifying the process for replacement of home automation devices.

BRIEF DESCRIPTION OF THE DRAWINGS

FIG. 1 illustrates a block diagram of a home automation system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a home automation system 10 shown generally in accordance with an illustrated embodiment. The home automation system may be embodied in any of a number of different forms. For example, the home automation system may be embodied as a security system. Alternatively, the home automation system may be embodied as a device that controls environmental devices (e.g., lighting, heating, cooling, etc.). Under still another embodiment, the home automation system may incorporate both security and environmental control devices.

Included within the system may be a number of wireless sensors 12, 14 that detect threats within a secured geographic area (e.g., a home) 16. Alternatively or in addition, the secured area may include one or more environmental control devices 18, 20. One or more (or all) of the sensors and/or control devices may operate under a Z-wave format.

The wireless sensors may detect any of a number of different types of threats. For example, some of the sensors may be switches mounted on the doors and/or windows that provide entrance into or egress from the secured area. Other sensors may be passive infrared (PIR) devices placed within the secured area to detect intruders who have been able to circumvent the switches mounted to the doors and/or windows.

Other sensors may be environmental sensors (e.g., temperature, smoke, fire, carbon monoxide. In some cases, environmental sensors (e.g., temperature sensors) may be used to activate and deactivate environmental control devices (e.g., heating, cooling, etc.).

The sensors may be monitored by a control panel 22 either located within the secured area as shown in FIG. 1 or located remotely. For example, upon detecting a threat via activation of one of the sensors, the control panel may send an alarm message to a central monitoring station 24. The central monitoring station may respond by summoning the appropriate help (e.g., police, fire department, etc.).

The system may be controlled by a human user through a user interface 34. Where the system incorporates a security system, the user may arm or disarm the system through the user interface by entering a personal identification (PIN) number and selecting a function through a keyboard 38. The user may determine and verify the status of the system via information shown on a display 36.

Included within the control panel, sensors, automation devices and user interface may be control circuitry that accomplishes the functionality described below. For example, the circuitry may include one or more processor apparatus (processors) 26, 28, each operating under control of a computer program 30, 32 loaded from a non-transitory computer readable medium (memory) 35. As used herein, reference to a step performed by a computer program is also reference to the processor that executed that step.

For example, a status processor operating within the control panel may monitor the user interface for control instructions related to the security system. Upon detecting an arm or arm away command, the status processor may enter an armed or armed away state. Upon detecting a disarm command, the status processor may enter a disarmed state.

In the armed state, an alarm processor may monitor the threat sensors for threats. Upon detecting a threat, the alarm processor may compose an alarm message to be sent to the central monitoring station. The alarm message may include an identifier of the secured area (e.g., an address, account number, etc.), an identifier of a type of threat (e.g., fire, intrusion, etc.), an identifier of the specific sensor activated and the time. Alternatively, the home automation control devices may be activated by a timer.

In the case of the home automation devices, an automation controller may monitor for inputs and activate the home automation devices accordingly. Inputs may be received through the keyboard or wirelessly through a portable device (e.g., cellphone) of the user.

The sensors and environmental control devices may be wirelessly connected to the control panel directly or through a mesh network. Upon activation of each device, the device may search a predefined spectrum for a beacon transmitted by the control panel. The beacon may include an identifier of the system and information about how to form a wireless connection with the system. For example, the beacon may define a communication frame and superframe including a number of transmitting and receiving slots under a time division multiplexing multiple access (TDMA) format. The beacon may also include an identifier of a location within the frame and superframe where a sensor may transmit a registration message.

Upon receiving and decoding the beacon, a newly activated sensor may transmit a registration message in the designated location of the superframe. A registration processor within the control panel may receive the registration message, verify the identity of the sensor and assign the sensor to separate transmission and reception slots of the frame and superframe.

Following detection and recognition by the control panel of a newly activated sensing or control device, the registration processor may display a list of newly detected sensors and/or control devices on the display of the user interface. The registration processor may also display the type of device and an indicator of whether the device is activated or not activated.

In order to install the device into the system, the user may determine the function and location of the device and assign a number of system operating attributes to the device. For example, if the device is a lighting controller, then the user would assign a control attribute to the device. If the device is a sensor, then the user assigns a sensing attribute to the device. In this regard, assigning attributes to the device automatically links the device to the appropriate program that operates in conjunction with the device to give the device the proper functionality.

For example, a lighting control device is linked to (and controlled) by a lighting control program (and processor). In this case, the lighting control processor receives input from the user and sends an activation command to the device.

Similarly, if the device is a sensor, then the device is linked to a monitoring program that takes the proper action in response to activation of the sensor. For example, a fire sensor is monitored by a fire detection processor that sends a specific type of alarm message to a central monitoring station. Similarly, an intrusion sensor is monitored by and sends a different type of alarm message to the central monitoring station.

In addition to functional attributes, each device also has location attributes that are assigned by the user. The locational attributes may be a room where a lighting controller controls a lighting level. A grouping attribute may also group fire sensors in a portion of a building in order to provide better destination information to first responders.

In addition, the device may have a purpose attribute. For example, an intrusion sensor has the purpose of sending an intrusion alarm to the central monitoring station. The purpose attribute links the intrusion sensor to a program that sends intrusion alarms to the central monitoring station. Similarly, the purpose attribute links a fire sensor to a program that sends fire alarms to the central monitoring station.

The device may also have a name attribute assigned by the user. In this case, the name may be a word or short text message that is displayed along with an alert that allows a user to more easily identify the reason for the alert (e.g., "fire on $1^{st}$ floor, etc.).

In general, control attributes are not related to system addresses. In this case, system addresses are assigned independently when the device first registers with the control panel. For example, upon initially registering with the control panel, a newly activated device may be assigned a system address before being assigned to any location or purpose.

Once the user has assigned an appropriate set of operating attributes to each sensor and control device, the system may be placed into an operating mode. While in the operating mode, each sensor or control device is accessed or controlled by a respective program based upon the assigned attributes of the device.

While the assignment of attributes to home automation devices is important, it is also tedious. If a device fails, then the attributes must be re-entered.

Under one illustrated embodiment, the pre-assigned attributes of sensors and control devices are automatically assigned to a replacement sensor or control device by following a simple routine initiated through the control panel. Under the embodiment, a user accesses a device replacement program that displays a list of each sensor and control device previously registered with the system. The user then selects one of the devices and the program displays a request for confirmation from the user. The user then activates the replacement sensor. In addition, or as an alternative, the device may have an enroll button on the device. Once the device has been activated, the user confirms the replacement request.

Once a device has been selected for replacement, a deletion processor within the control panel operatively deletes and/or removes the original device from the system, but retains the attributes of the device. Once deleted, an installation processor looks for the concurrent registration of a new device. The installation processor may assume that this new device is the replacement device, or the installation processor display device details obtained from the device (e.g., model, revision number, etc.) and asks the user to confirm the replacement. Once confirmed, the installation processor may install the replacement device in place of the deleted device. Installation in this case means the automatic assignment of the attributes of the deleted device to the replacement device.

In general, dealers/installers have been the source of many complaints regarding the maintenance and replacement of Z-wave devices in existing home automation systems. If a Z-wave device is abnormal in some way and has to be replaced, it is very time consuming to rename the device, reconfigure the attributes (the contextual scenes of use) related to the device, and so on.

For example, replacing a Z-wave device in a conventional system requires at least four steps. First, the user must access and remove the abnormal device via the keypad screen. Second, the user must enroll the new (replacement) device into the system using the keypad. Next, the user must rename the newly enrolled device with the same name as the old device. Finally, the user must reconfigure related automation scenes (defined by the attributes) into the interface of the newly enrolled device.

The system of FIG. 1 offers a method of fast replacement. Fast replacement of Z-wave devices is an improvement over conventional methods by saving time and effort based upon a number of novel features. First, the keypad provides a replacement feature (program) to automatically manage and implement this use case. The installer or other user need only click on a replacement feature or icon and an "enroll" button on the new device to complete the whole replacement process. The keypad activates a program that automatically removes the old device and then (by operation of the program) the new device automatically inherits the old Z-wave device's related settings, including names, scenes, etc. by migrating the settings, names, scenes, etc. to the new device.

As noted above, the installer can accomplish the device replacement with a very simple set of convenient steps as follows. First, the installer selects a first device to be replaced and clicks a "replace" button on the keypad screen. Next, the installer may walk to the new or replacement device and presses an "enroll" button on the device to finish device enrollment. Finally, upon the successful enrollment of the device and confirmation that the devices types are the same, the program activated through the keypad will cause the new device to inherit the old device's name and, in addition, changes (i.e., transfers) all the scene settings from the old device to the new device.

In general, the system includes a home automation system having a plurality of sensors that detect events within a predetermined geographic area, a first wireless sensor of the plurality of sensors that operates within the home automation system under a Z-wave format wherein the first wireless sensor has a number of predetermined system operating attributes that are not related to a system address of the first sensor, a replacement wireless sensor having a processor that communicates under a Z-wave format and a program executing on a processor of the home automation system that operatively removes the first sensor from the home automation system and automatically enrolls the replacement sensor with the home automation system by assigning the predetermined system operating attributes to the replacement sensor.

Alternatively, the system may include a security system having a plurality of sensors that detect threats within a secured geographic area, a first wireless sensor of the plurality of sensors that communicates with the security system under a Z-wave format wherein the first wireless sensor has a number of predetermined system operating attributes that are not related to a system address of the first sensor, a replacement wireless sensor having a processor that communicates under a Z-wave format and a program executing on a processor of the security system that operatively removes the first sensor from the security system and automatically assigns the predetermined system operating attributes to the replacement sensor.

Alternatively, the system may include a security system having a plurality of sensors that detect threats within a secured geographic area, a first wireless sensor of the plurality of sensors that communicates with the security system under a Z-wave format wherein the first wireless sensor has a predetermined number of system operating attributes that are not related to a system address of the first sensor, a replacement wireless sensor having a processor that communicates under a Z-wave format, a control panel of the security system that displays a name of each of the plurality of sensors and a location within the secured area and a program executing on a processor of the security system that receives an identifier of the first sensor through the control panel, operatively removes the first sensor from the security system and automatically assigns the predetermined operating attributes to the replacement sensor.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
   a home automation system having a plurality of sensors that detect events within a predetermined geographic area;
   a user interface of the home automation system;
   a first wireless sensor of the plurality of sensors that operates within the home automation system under a Z-wave format, wherein the first wireless sensor has a number of predetermined system operating attributes and scene settings stored in a memory of the user interface;
   a replacement wireless sensor having a device type equivalent to the first wireless sensor; and
   a processor of the user interface that receives user input from the user interface and, responsive thereto, initiates a device replacement program,
   wherein, responsive to the processor initiating the device replacement program, the device replacement program initiates a display of a list of the plurality of sensors on the user interface,
   wherein, responsive to receiving a selection of the first wireless sensor from the list, the user interface displays a replace button, and
   wherein, responsive to activation of the replace button, the device replacement program operatively removes the first wireless sensor from the home automation system while simultaneously retaining the predetermined system operating attributes and the scene settings of the first wireless sensor in the memory and automatically enrolls the replacement wireless sensor with the home automation system by assigning the predetermined system operating attributes and the scene settings of the first wireless sensor stored in the memory to the replacement wireless sensor.

2. The system as claim 1 wherein the home automation system includes a security system.

3. The system as in claim 1 wherein the plurality of sensors include threat sensors.

4. The system as in claim 3 wherein at least some of the threat sensors include one of an intrusion sensor and a fire detector.

5. The system as in claim 1 wherein the processor automatically enrolls the replacement wireless sensor in response to activation of an enroll button on the replacement wireless sensor.

6. The system as in claim 1 wherein the predetermined system operating attributes include a functional name of the first wireless sensor.

7. A system comprising:
   a security system having a plurality of sensors that detect threats within a secured geographic area;
   a user interface of the security system;
   a first wireless sensor of the plurality of sensors that communicates with the security system under a Z-wave format, wherein the first wireless sensor has a number of predetermined system operating attributes and scene settings stored in a memory of the user interface;
   a replacement wireless sensor having a device type equivalent to the first wireless sensor; and
   a first processor of the user interface that receives user input from the user interface and, responsive thereto, initiates a device replacement program, wherein, responsive to the first processor initiating the device replacement program, the device replacement program initiates a display of a list of the plurality of sensors on the user interface, wherein, responsive to receiving a selection of the first wireless sensor from the list, the user interface displays a replace button, and wherein, responsive to activation of the replace button, the device replacement program operatively removes the first wireless sensor from the security system while simultaneously retaining the predetermined system operating attributes and the scene settings of the first wireless sensor in the memory and automatically assigns the predetermined system operating attributes and the scene settings of the first wireless sensor stored in the memory to the replacement wireless sensor.

8. The system as in claim 7 wherein the first processor automatically assigns the predetermined system operating attributes and the scene settings to the replacement wireless sensor in response to activation of an enroll button on the replacement wireless sensor.

9. The system as in claim 7 wherein the predetermined system operating attributes include a name of the first wireless sensor.

10. The system as in claim 7 wherein a second processor of the replacement wireless sensor automatically registers the replacement wireless sensor with the security system.

11. The system as in claim 10 wherein the first processor transmits a beacon that identifies the security system to the replacement wireless sensor.

12. The system as in claim 11 wherein the beacon includes an identifier of a type and a version of the security system.

13. The system as in claim 7 wherein the plurality of sensors form a mesh network.

14. The system as in claim 7 wherein the list includes a respective name of each of the plurality of sensors and a respective location of each of the plurality of sensors within the secured geographic area.

* * * * *